United States Patent [19]
Evans

[11] 3,860,924
[45] Jan. 14, 1975

[54] MOVING TARGET INDICATOR SYSTEM

[75] Inventor: Norol T. Evans, San Pedro, Calif.

[73] Assignee: Hughes Aircraft Company, Culver City, Calif.

[22] Filed: Aug. 31, 1973

[21] Appl. No.: 394,888

[52] U.S. Cl. ............... 343/7.7, 343/5 DP, 343/7 A, 343/100 LE
[51] Int. Cl. ........................... G01s 9/02, G01s 9/42
[58] Field of Search ..... 343/5 DP, 7.7, 7 A, 100 LE

[56] References Cited
UNITED STATES PATENTS

| | | | |
|---|---|---|---|
| 3,094,695 | 6/1963 | Jahn | 343/100 LE |
| 3,631,488 | 12/1971 | Evans | 343/7.7 |
| 3,755,813 | 8/1973 | Evans et al. | 343/7.7 |
| 3,781,883 | 12/1973 | Effinger | 343/7 A |
| 3,787,848 | 1/1974 | Laundry | 343/7.7 |

*Primary Examiner*—Malcolm F. Hubler
*Attorney, Agent, or Firm*—Walter J. Adam; W. H. MacAllister, Jr.

[57] ABSTRACT

An improved moving target indicator system operable with antenna side lobe blanking, that substantially eliminates false target reports at the output of the moving target indicator so as to overcome a problem associated with radar systems using moving target indicator and side lobe blanking arrangements. The system provides one additional bit or an action bit in memory for each range bin in each canceller stage of the moving target indicator system. When side lobe blanking occurs, an associated bit is applied to the system and this bit is allowed to propagate through the second canceller as well as any subsequent cancellers. Thus, during each pulse repetition interval that would be affected by side lobe blanking action, a blanking gate is energized to inhibit the generation of false targets. For a radar system utilizing step transmission, a variable recirculating delay is provided to insure that regardless of the time of occurrence of the side lobe blanking condition, the output of the moving target indicator unit will be blanked the required number of periods.

11 Claims, 9 Drawing Figures

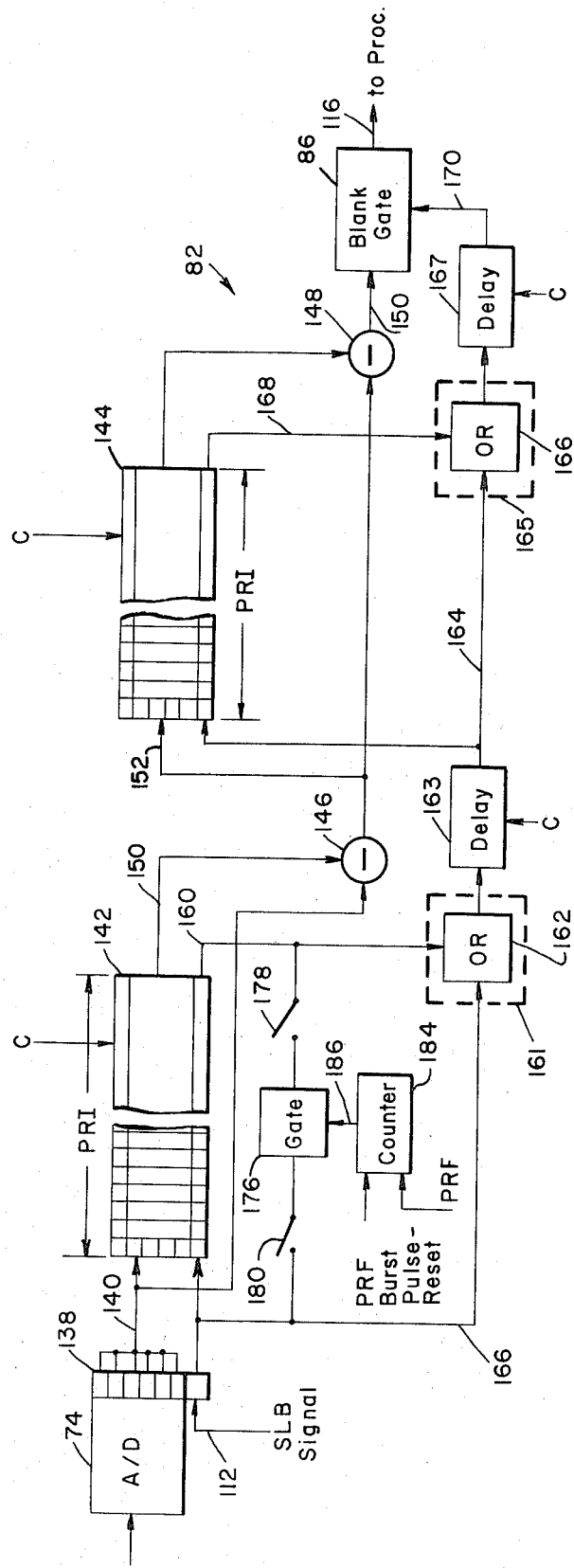

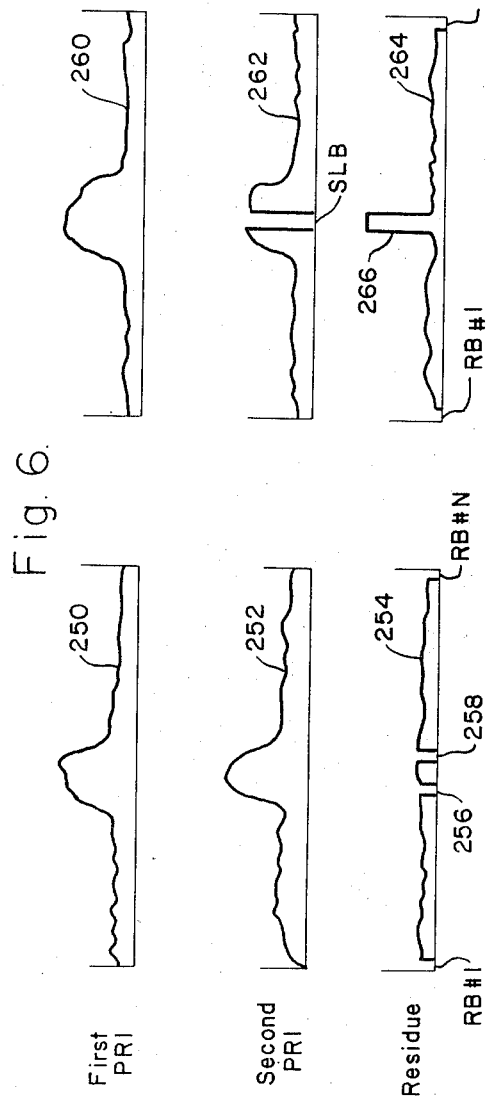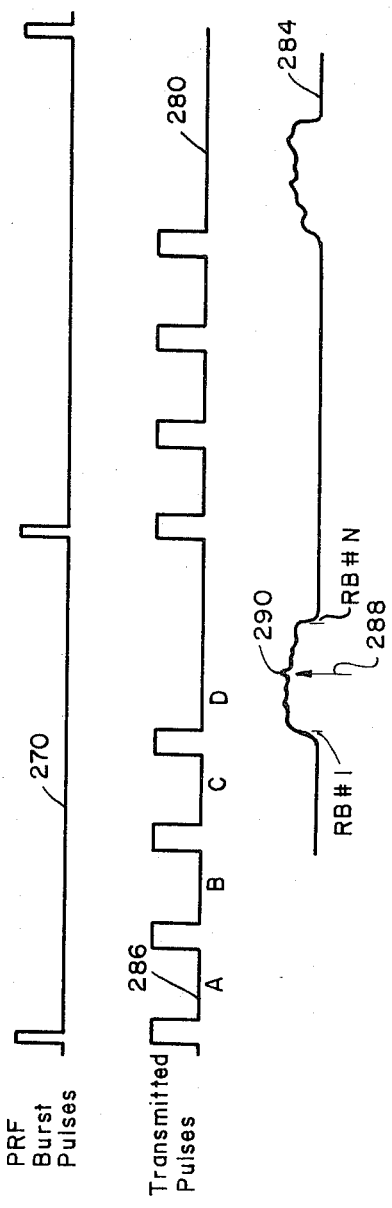

MOVING TARGET INDICATOR SYSTEM

BACKGROUND OF THE INVENTION

1. Field of the Invention

This invention relates to radar systems and particularly to an improved combination of a moving target indicator system and a side lobe blanking system.

2. Description of the Prior Art

In conventional side lobe blanking receivers utilizing an auxiliary antenna arrangement, the side lobe signals are processed in the side lobe receiver in an identical manner to the processing of the signals in the main radar receiver. Energy for the side lobe receiver is obtained from a separate antenna whose spatial coverage substantially matches that of the radar antenna side lobe pattern. The detected outputs of the two receivers are then compared and if the amplitude of the video from the side lobe receiver exceeds the amplitude of the radar receiver video, a blanking gate having the width of the side lobe video is generated. This blanking gate is used for blanking the corresponding false target or any target appearing in the radar receiver at that time. If the amplitude of the radar receiver video exceeds that of the side lobe receiver video, a blanking gate is not generated and a target is assumed to be real. However, in a radar system having a moving target indication mode, the side lobe blanking can cause a substantial increase in false target reports at the output of the moving target indicator (MTI). As an example, the MTI transfer function $EO$ for a double canceller at each range bin is $EO = A - 2B + C$ where the letter "$C$" corresponds to the most recent transmission and $B$ and $A$ are respectively earlier transmissions. Also assume that there is clutter that normally would cancel with an amplitude of about 20db above rms noise present at the sample range bin and let the rms noise level be set at 1.0 volts resulting in $EO = +10 - 2 \times 10 + 10 = 0v$ for the normal cancelled condition as 20db represents 10 volts above 1.0 volt. In the first step of this double canceller example, due to side lobe blanking action, $C$ is set to 0 and $EO = 10 - 2 \times 10 + 0 = -10$ v or an uncancelled residue of $20 - 7.8$ or approximately 12.2db above noise. During the next step or pulse repetition interval in a continuous scan radar system or the next processable pulse repetition interval in a step scan radar system, C becomes B in the equation, so we have $EO = +10 - 0 + 10 = 20$ or an uncancelled residue of $26 - 7.8$ which is approximately 18.2db above noise. During the third transmission or effective pulse repetition interval occurring after step 2 the value of $C$ now appears in position $A$ of the equation resulting in $EO = 0 - 2 \times 10 + 10 = -10v$ or an uncancelled residue of +12.2db above noise. Thus if the MTI output is used directly, a large false target rate will occur anytime side lobe blanking occurs in the presence of a cluttered area. If the MTI residue in a conventional system is applied to a doppler processor, for example, then substantial velocity side lobes will be generated in clutter and may ring substantially all of the filters in a plurality of range bins.

SUMMARY OF THE INVENTION

In the radar system of the invention a side lobe blanking system is provided in combination with a moving target indicator system that operates to eliminate the substantial increase in false target reports that occur at the output of conventional side lobe blanking and moving target indicator systems. In order to provide a relatively low false target rate, an action bit is provided in the memory for each range bin in each canceller stage of the MTI unit. When side lobe blanking occurs at any range bin, an associated bit is set true, allowed to propagate through canceller stages to a blanking gate and is stored in that range bin position of the memories in each canceller stage. During each subsequent pulse repetition interval for each range bin, the action bit stored during the preceeding pulse repetition interval is applied to control the blanking gate at the output of the MTI unit. Blanking occurs automatically in accordance with the invention until the residues affected by the side lobe blanking action have been transferred out of the last canceller stage of the MTI unit. Thus, the automatic blanking operation solves the problems which occur in conventional systems whether the blanking gate precedes or is after the MTI unit.

It is therefore an object of this invention to provide an improved radar system utilizing side lobe blanking and a moving target indicator that will operate at a relatively low false target rate.

It is a further object of this invention to provide a side lobe blanking and moving target indicator system that will operate with a high degree of reliability without degrading detection in a pulse doppler system.

It is another object of this invention to provide a radar system operable with side lobe blanking and moving target indication while developing a relatively low false target rate in both a continuous scan or a step scan radar mode.

It is a further object of this invention to provide a moving target indicator system and side lobe blanking system that with a minimum of additional hardware, substantially eliminates erroneous target reports conventionally caused by the side lobe blanking action.

BRIEF DESCRIPTION OF THE DRAWINGS

These and other objects, features and advantages of the invention itself, will become apparent to those skilled in the art in the light of the following detailed description taken in consideration with accompanying drawings wherein like reference numerals indicate like corresponding parts throughout the several parts wherein:

FIG. 3 is a schematic block diagram of the moving target indicator portion of the invention illustrated as having two canceller stages and responding to the side lobe blanking signals;

FIG. 6 is a schematic diagram of waveforms for explaining the uncancelled residue signals resulting from side lobe blanking action that the system of the invention eliminates;

FIG. 7 is a schematic diagram showing waveforms of amplitude as a function of time for further explaining the operation of the system of the invention in a step scan radar system.

DESCRIPTION OF THE PREFERRED EMBODIMENT

Figure 1:
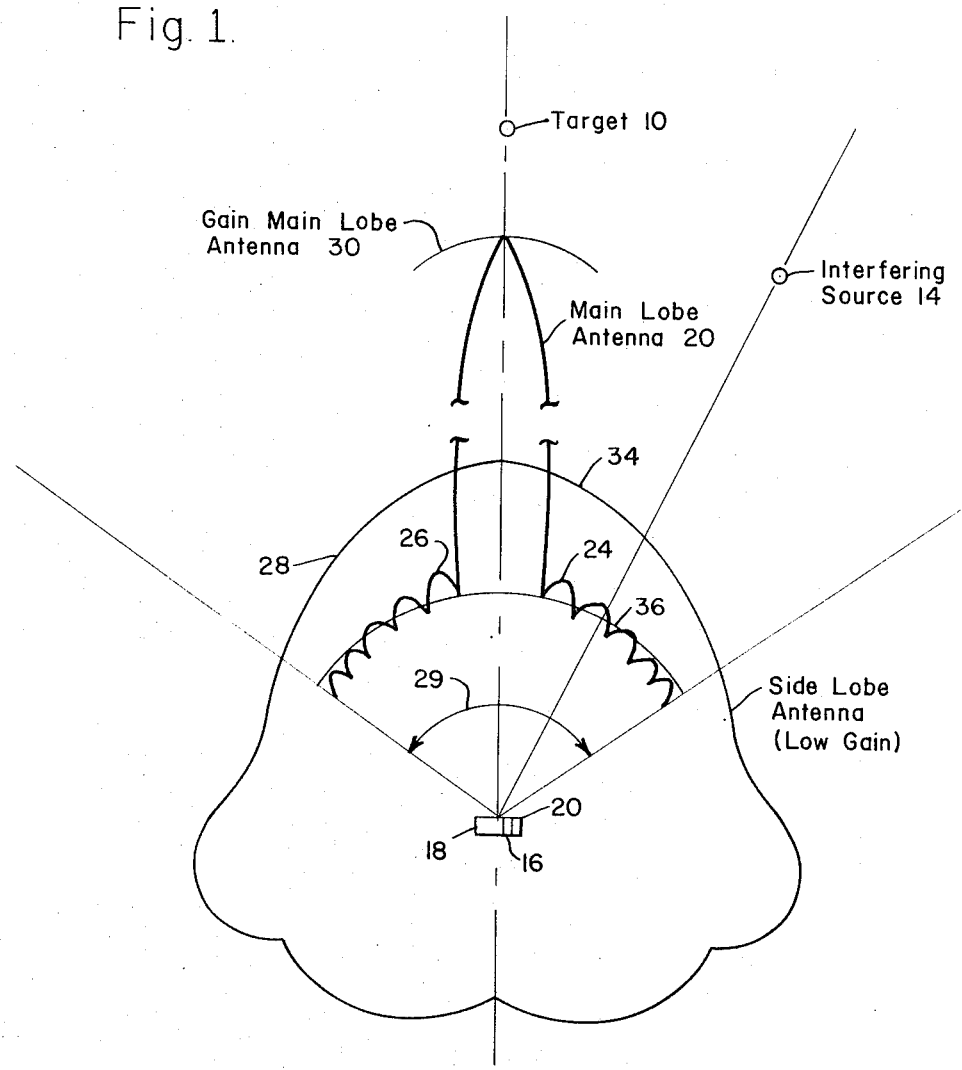
FIG. 1 is a schematic plan view showing the gain characteristics of the main lobe antenna and the side lobe antenna for explaining the side lobe blanking operation of the system of the invention in response to energy received from targets and from interfering sources.

Referring first to FIG. 1, general operation of the side lobe blanking system in accordance with the invention will be first explained relatively to a target 10 and an interferring source 14. An antenna system 16 may include a main lobe or radar antenna 18 and a side lobe or auxiliary antenna 20, normally positioned adjacent to each other or in close proximity. In some arrangements in accordance with the invention the antennas 18 and 20 may be different aperture elements in the same array or may be parabolic dish type antennas placed substantially close to each other. The radar antenna 16 has a main lobe pattern 20 and a plurality of side lobe patterns such as 24 and 26. The auxiliary antenna 18 which is a side lobe antenna may be a low gain antenna and have an antenna pattern such as 28 which may be of a substantially constant amplitude over an azimuth receiver range of an angle 29. Within the scope of the invention the side lobe antenna may be an omnidirectional antenna or any suitable antenna having a predetermined gain pattern. The gain of the main lobe antenna is shown by a line 30 and the gain of the side lobe antenna 18 is shown by line 34.

The side lobes of the radar antenna have a general amplitude indicated by a line 36 and a gain between that of the side lobe or auxiliary antenna 28 and the side lobe antenna gain of the line 36 may, for example, be selected to be approximately 6db. Energy from the interferring source 14 has a gain in the side lobe antenna indicated by the line 34 and a gain in the main lobe antenna indicated by the line 36. Thus, energy received from the source 14 is interpreted as side lobe energy, to be blanked out in response to a comparison of the side lobe signal amplitude to the radar signal amplitude in which the side lobe signal amplitude is larger. In the system of the invention this blanking of the main load energy in response to the side lobe blanking system, which causes the energy of an entire range bin to be blanked, does not degrade the system performance in a moving target indicator unit because of the improved control arrangement.

Figure 2A:
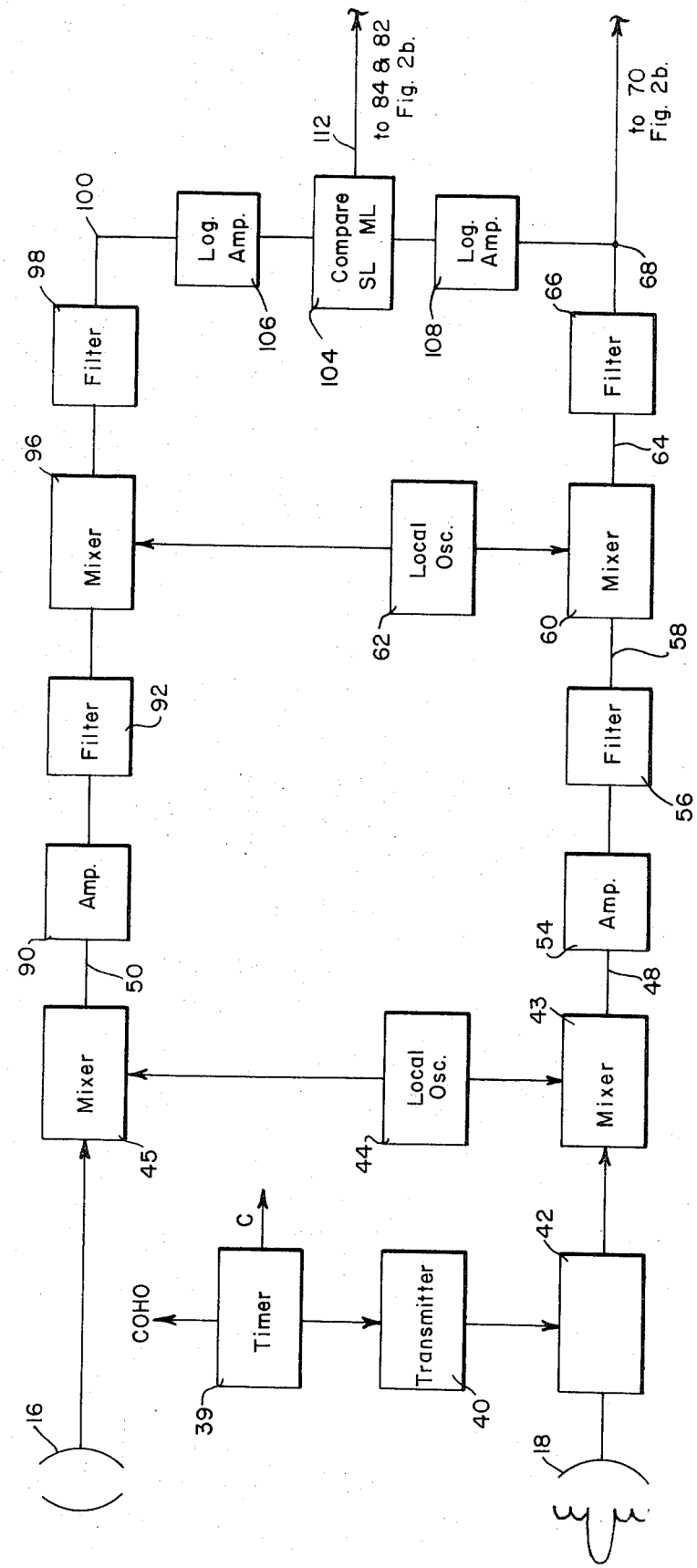
FIGS. 2a and 2b together are a schematic block diagram of the side lobe blanking and moving target indicator system in accordance with the invention for providing a relatively low false target rate.
Figure 2B:
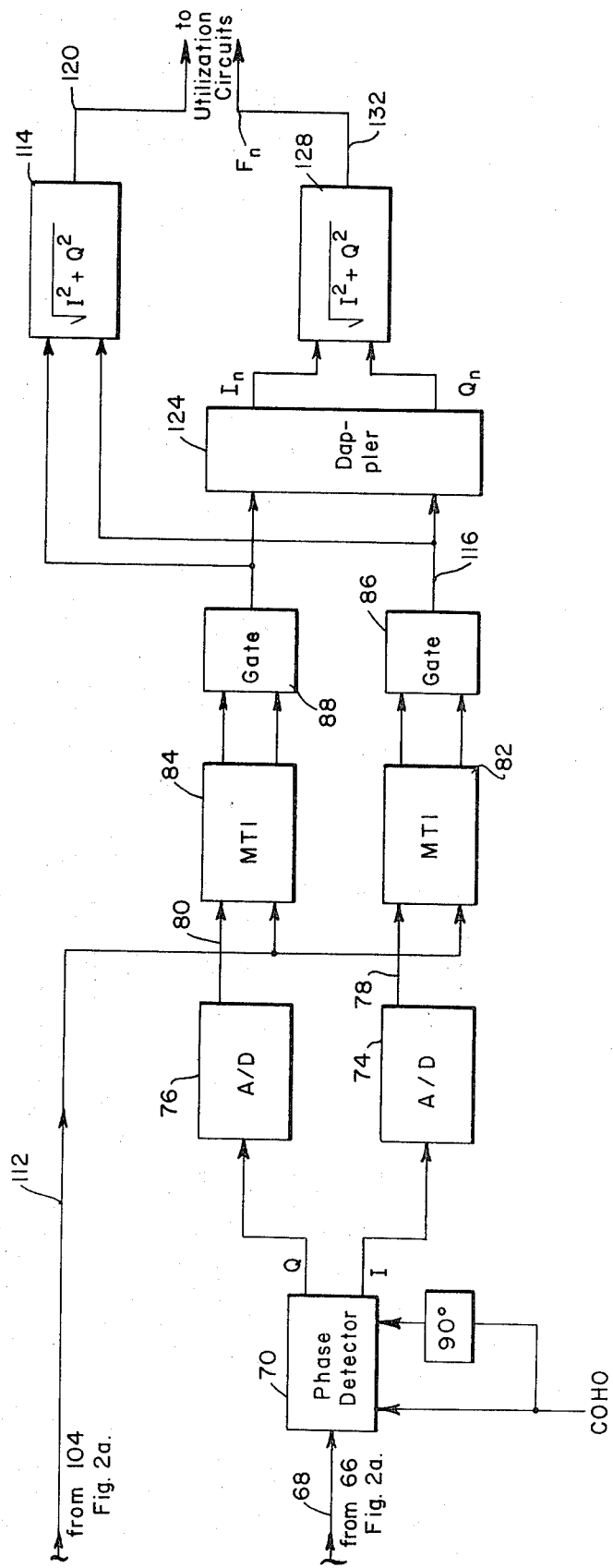

Referring now also to the block diagram of FIGS. 2a and 2b which shows an analog version of the side lobe blanking system in accordance with the invention operating with a moving target indicator system, a transmitter 40 may be provided to transmit pulses of energy through a suitable duplexer 42 and the antenna 18 into space. The energy reflected from a target or object in space is then intercepted by the antenna 18 and passed through the duplexer 42 to a conventional mixer 43 responsive to a local oscillator 46 for applying a radar IF (Intermediate Frequency) signal to a lead 48. At the same time, energy may be received from an interfering source such as 14 (FIG. 1) by the antenna 16 and applied to a mixer 45 to provide a side lobe IF signal on a lead 50. The interfering source 14 may be any operating radar system providing interference energy, a side lobe repeater as is well known in the art or any pulsed interference generator responsive to the received PRF, for example. As is well known in the art, side lobe blanking (SLB) is used primarily to blank interfering or jamming pulses which are of such a short timed duration that other types of canceling arrangements are unable to acquire these pulses. The antenna 18 also receives the interfering signals and the antenna 16 receives the target reflection signals; but the selected gains allow the signals to be distinguished as explained relative to FIG. 1. A timer 39 controls the timing of the transmission of pulses and may provide clock (C) pulses to define the range bins during each pulse repetition interval. The IF radar signal on the lead 48 is applied to an amplifier 54 and in turn to a suitable filter 56 and through a lead 58 to a mixer 60, controlled by a local oscillator 62. The second IF signal is applied from the mixer 60 through a lead 64 to a suitable filter 66 and to a lead 68. The filtered signal on the lead 68 is applied through a phase detector circuit 70 generating in-phase I and quadrature components Q which in turn are applied to respective analog to digital (A/D) units 74 and 76. The circuit 70 responds to a coherent reference signal from the timer 39 in both an in-phase and a quadrature form. The digital signals from the A/D units 74 and 76 are respectively applied through leads 78 and 80 to MTI or moving target indicator units 82 and 84. The target signal outputs of the MTI units 82 and 84 along with a gate control signal are applied to respective side lobe blanking gates 86 and 88.

In the auxiliary channel, the IF signal on the lead 50 is applied through an amplifier 90 and a filter 92 to a mixer 94, which in turn responds to the local oscillator 62 to apply a second IF signal through a filter 98 to a lead 100. A comparison circuit 104 responds to the logarithmic signal provided by log amplifiers 106 and 108 respectively coupled to leads 100 and 68 to generate a side lobe blanking gate signal whenever the logarithmic signal in the auxiliary channel is larger than the logarithmic signal in the main channel. The blanking gate signal is applied from the comparative circuit 104 through a lead 112 to MTI circuits 82 and 84 to provide improved blanking control for both the in-phase and the quadrature components. For conversion of the in-phase and quadrature signals passed through the gates 86 and 88, combiner circuit 114 coupled to leads 116 and 118 may be utilized to generate the $\sqrt{I^2+Q^2}$ as is well known in the art to develop the combined radar signal on a lead 120 which is applied to utilization circuits such as a processor or display. As is well known in the art, the component combiner 114 may use an approximation $(I + KQ)$ when I is greater or equal than Q and $(KI + Q)$ when Q is greater or equal to I. In a system utilizing a doppler processor 124, the in-phase and quadrature components on the leads 116 and 118 are applied through separate doppler filter banks to ring specific filters and apply signals In and Qn to a signal combiner unit 128. Either a circuit for providing the $\sqrt{I^2+Q^2}$ or the above discussed approximation may be utilized in the component combiner 28 to genrete a filter number Fn on an output lead 132 which is also applied to suitable utilization circuits.

Referring now to FIG. 3 which shows a two-stage MTI unit such as the in-phase MTI unit 82, the operation of the invention will be explained in further detail. It should be noted that the MTI unit 84 in the quadrature channel may be similar to the unit 82. The A/D unit 74 may include a register such as 138 in which the digital value is stored for transfer through a composite lead 140 as a plurality of parallel bits representing the signal amplitude in a range bin to be applied to the first range bins stage of a shift register unit 142. A number of shift registers are provided in the unit 142 in the direction of data shift equal to the number of range bins plus one with each range bin position having the same number of flip-flops as provided by the A to D converter 74 to represent the amplitude of the signal. Each range bin stage receives a shift or clock pulse C from the timer 39 to transfer the data from left to right along the shift register so that the oldest data is always in the right hand or output stage of the unit 142. The target indicating signal is applied from the last stage of the shift register through a lead 150 in combination with the latest or newest data on the lead 140 to a subtractor unit 146, which provides a first residue or difference signal which in turn is applied through a lead 152 to the input of a shift register 144 of the second cancelling stage as well as to a subtractor 148 of that stage. The subtractors 146 and 148 may receive a clock pulse C as is well known in the art to provide a one range bin delay. The target signal from the last stage is also applied from the shift register 144 to the subtractor 148 to pass a second residue or target representing signal through a lead 150 to the blank gate 86. A side lobe blanking signal on the lead 112 is applied to a first storage element such as a first flip-flop of a plurality of flip-flops with one at each range bin location positioned along the register 142 for storing the blanking bit with the target data from the corresponding range bin. The side lobe blanking bit signal or action bit is shifted into the last range bin position of the register 142 a pulse repetition interval (PRI) after reception and through a lead 160 to an OR gate 162 of a coupling unit 161. Also, the newest action bit derived from data of the range bin presently being transferred into the register 142, is applied through a lead 166 to the OR gate 162. If a logical OR gate 162 is utilized in the coupling unit 161, a one range bin delay flip-flop responsive to the range bin clock may be provided at the output of the gate 162 because a one range bin delay may be provided in the subtractor unit 146. If the unit 161 includes a flip-flop to provide the coupling, a separate delay unit 163 is not required. The output of the OR gate 162 is applied through a lead 164 both to the input of the shift register 144 and to an OR gate 166 of a coupling unit 165 which also receives any action bit shifted out of the register 144 through a lead 168. Similar to the coupling unit 161, a one range bin delay unit such as a flip-flop 167 may be provided if a logical OR gate is utilized in the unit 165 instead of a delay flip-flop, which arrangement compenates for the delay in the subtractor 148. The output of the OR gate 166 provides a gating control signal which is applied through a lead 170 to the blank gate 86 to energize that gate and prevent a target signal from passing therethrough for substantially an entire range bin interval.

Thus, in a continuous scan radar system for the two-stage canceller of FIG. 3 during a first pulse repetition in any range bin interval the side lobe blanking signal on the lead 112 is applied to the input of both registers 142 and 144 as well as through the lead 164, the OR gate 166, and the lead 170 to blank the gate during that range bin, or two range bins later if a compensating delay is provided for the subtracting operation. During the next pulse repetition interval for a continuous scan type radar system the action bit appears on the lead 160 during the occurrence of the same range bin data which, with a delay, is the next range bin interval and is applied through the OR gate 162 to the input of the register 144 and through the lead 164, the OR gate 166 and the lead 170 to energize the blanking gate 86. During the following or third pulse repetition interval for the same range bin data for a continuous scan radar system, the action bit is shifted to the last stage and is applied through the lead 168, the OR gate 166 and the lead 170 to energize the blanking gate 86. However in the fourth pulse repetition interval for the same range bin data the same action bit is no longer present and the target residue signal is passed from the lead 150 through the gate 86 to the lead 116. It is to be understood that each range bin may have a blanking signal provided by the comparison of the side lobe amplitude being greater than the main lobe amplitude and the system continues to provide blanking at the gate 86 until the third pulse repetition interval is completed at that particular range bin without the occurrence of a side lobe blanking signal. Thus, for n canceller stages, each action bit blanks at a particular range bin for $(n + 1)$ pulse repetition intervals. False targets caused by improper cancelling in conventional arrangements are prevented from being passed to the remainder of the system in accordance with the invention.

For a step scan type radar system in which a burst of pulses such as four pulses, for example, are transmitted at each azimuth position, to provide fill pulses as are well known in the art, recirculation of the action bit in the first canceller stage is provided by a gate 176 with switches 178 and 180 in a closed position. For this type of radar operation a controlled circulation of each side lobe blanking bit for a selected number of pulse repetition intervals is required. A PRF (pulse repetition frequency) burst pulse may be provided by a suitable timer such as 39, (FIG. 2) to set a counter 184 which in turn is coupled to the gate 176 through a lead 186 for applying a gating pulse thereto when the counter contains a count. For a step-scan radar system in which four hits or a burst of four pulses are transmitted at each aximuth position, the counter 184 is set to two, so that the action bit is recirculated during the following two PRI intervals (a count of 00 does not energize the gate 176) and is prevented from recirculating during the third PRI interval. A PRF trigger pulse is applied to cause the counter 184 to count from the timer 39 (FIG. 2). Thus, the action bit recirculated during the first two PRI intervals is shifted through the register 142 during the third PRI interval and is shifted through the register 144 during the fourth PRI interval to provide side lobe blanking to gate 86 at the time when the data is used in this type of radar system. It is to be noted that blanking may occur in the PRI intervals other than the interval that the data is utilized, but the operation of the blanking gate 86 has no effect during this time. The system of the invention operates with a pulse burst radar system of any desired number of pulses and, with a two stage canceller, for a five-hit system the counter 184 is set to 3, and for a six-hit system the counter 184 is set to 4 at the beginning of the pulse burst, for example.

Figure 4:
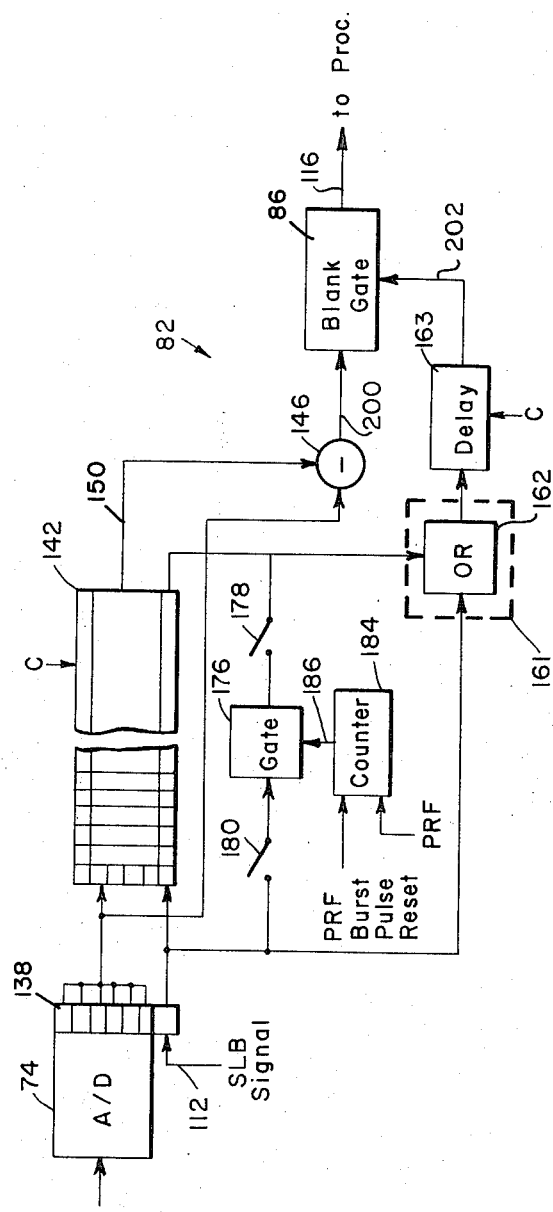
FIG. 4 is a schematic block diagram of the moving target indicator system having a single canceller stage in accordance with the invention and responding to the side lobe blanking signals.

Referring now to FIG. 4 which illustrates a single stage canceller, the components of the first stage of FIG. 3 in the blank gate have the same reference numerals with the subtractor 146 being coupled through a lead 200 to the blank gate 86 and the OR gate 162 being coupled through a lead 202 to the blank gate 86. For a single stage canceller at any range bin during a first PRI interval, the side lobe blanking signal or action bit is applied to the input of the register 142 as well as through the OR gate 162 to blank the output of the MTI for that range bin during that PRI interval. During the next PRI interval, the action bit is tranferred to the last range bin stage of the shift register 142 and passes through the OR gate 162 to blank the gate 86. During the next or third PRI interval, the original side lobe blanking signal is no longer present to provide any blanking and normal MTI operation is resumed for that particular range bin unless additional side lobe blanking has occurred in that or the previous PRI interval. The counter 184 for a step scan radar system, is set to a value as a function of the number of pulses of each pulse burst and the number of canceller stages as previously discussed, and for a four-hit radar system with a single stage canceller the counter is set to three so that during the fourth pulse repetition interval, the gate 86 is blanked. In a similar manner for a five-hit radar system with a single stage canceller the counter 184 is set to four at the beginning of each pulse burst and for a six-hit radar system the counter is set to five at the beginning of each pulse burst. The following table shows the setting of the counter 184 for certain numbers of pulses P for one to four stage MTI systems. It is to be noted that if systems are utilized having more than four canceller stages the number of pulses or hits P must be greater than four, increasing in number with increasing canceller stages:

| CounterSetting | No. of Canceller Stages |
| --- | --- |
| P-1 | 1 |
| P-2 | 2 |
| P-3 | 3 |
| P-4 | 4 |

Figure 5:
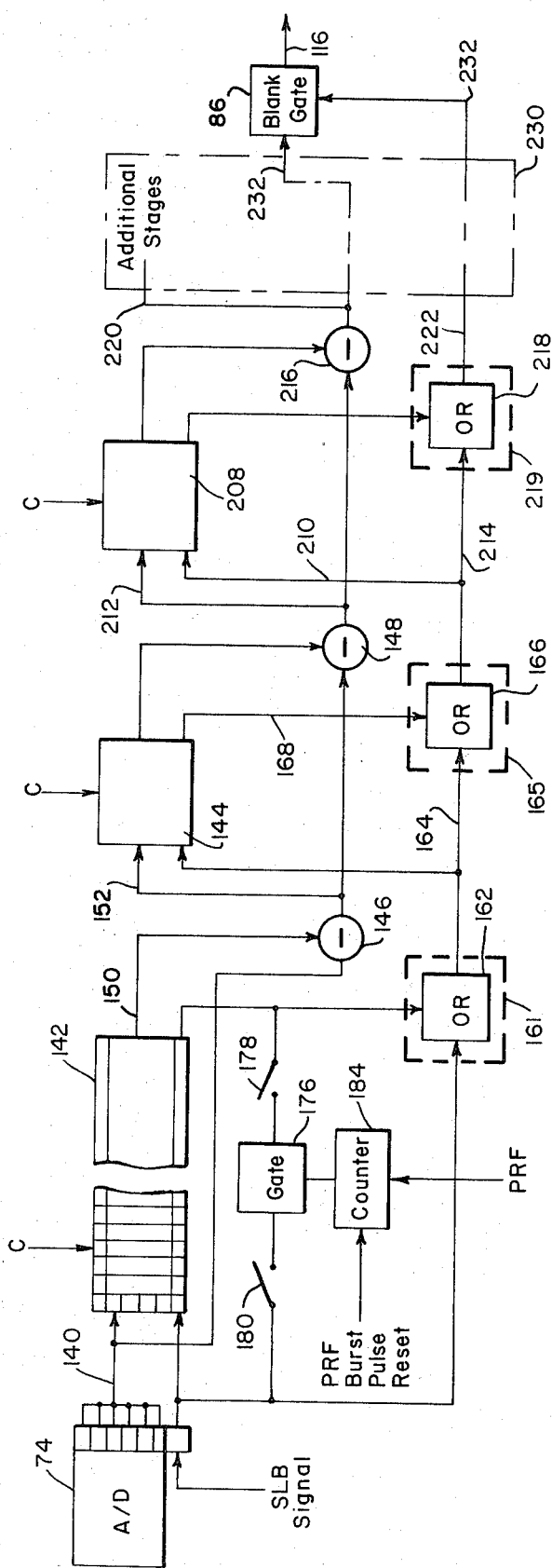
FIG. 5 is a schematic block diagram of the moving target indicator system having a plurality of canceller stages in accordance with the invention for further illustrating the operation of the system in accordance with the invention with any desired number of cancelling stages.

Referring now to FIG. 5, an additional MTI unit is shown to illustrate that the principles of the invention are operable with any number of desired canceller stages. The first two stages of the unit 82 hav the same reference numerals as the first two stages of FIG. 3 and the third canceller stage has a shift register 208 receiving data through a lead 212 from the subtractor 148 and an action bit through a lead 210 from the OR gate 166. The output of this canceller stage includes a subtractor unit 216 receiving target information from the last stage of the shift register 208 which is applied through a lead 220 and through any number of additional stages indicated as a dotted box 30 and through a lead 232 to the blank gate 86. An OR gate 218 of a coupling unit 219 receives the action bit from the OR gate 166 and from the output of the shift register 208 to apply the bit through the lead 222 to the additional stages 230 and through a lead 234 to the blank gate 86 to prevent the target information from passing to the output of lead 116. The OR gate functions of FIG. 5 may be provided by flip-flops or a delay unit (not shown) may be utilized if the corresponding subtractors have a one clock or range bin period delay. For a continuous scan radar system it can be seen that the action bit is transferred from the input to the lead 234 during the first PRI interval and is stored at the inputs of the shift register of each canceller stage. In the next PRI interval the action bit is transferred from the register 142 but again stored in the registers 144 and 208. In a third PRI interval, the action bit is transferred from the register 144 to activate the gate 86 but is again stored in the shift register 208. In the fourth PRI interval, the action bit is transferred from the register 208 and energizes the blanking gate 86 and may be stored in additional stages in the dotted box 230. Thus it can be seen that in the most recent PRI interval plus one additional PRI interval for each canceller stage or $(n+1)$ PRI intervals, the blanking gate is energized to prevent formation of erroneous or spurious targets. The gate 176 and the counter 184 operate as discussed previously except with three canceller stages, for example, at the beginning of each PRF burst pulse or four-hit system the counter is set to 1 so that only one circulation is provided, and for a five-hit system the counter is set to 2 and for a six-hit system the counter is set to 3 at the beginning of each PRF burst interval.

Referring now to FIG. 6 as well as to FIG. 3, the operation of the blanking will be explained in further detail. The signal of wave forms 250 and 252 indicate the target return for range bins 1 to N for respective first and second pulse repetition intervals. The residue after cancellation for the moving target is shown by waveform 254 over the same range bin interval which is a desirable residue signal without blanking having occurred. The system of the invention provides a signal substantially like that of waveform 254 except that for several range bins during the occurrence of side lobe blanking may show only noise as indicated at 256 and 258. Wave forms 260 and 262 are shown to indicate a condition, in a conventional system in which side lobe blanking occurs during the second pulse repetition interval to provide a waveform 264 having an uncancelled portion in the residue as indicated at 266, which is during the range bin that side lobe blanking occurred. Thus it can be seen that iin a conventional system, a high amplitude signal 266 would be falsely interpreted as a target over several pulse repetition intervals determined by the number of canceller stages in the MTI unit.

Referring now to FIG. 7 as well as to FIG. 3, the step scan operation in accordance with the invention will be explained in further detail. As shown by waveform 270, each burst of pulses is initiated by a PRF burst pulse which also resets the counter 184. For the illustrated four pulses for each burst, the pulse repetition intervals are labeled A, B, C and D at the waveform 280 in the first burst of pulses. The radar system utilizes the target data during the fourth pulse repetition interval, or the D interval, as indicated by the target data of the waveform 284 occurring over a period including range bin 1 to range bin N. Assuming side lobe blanking occurred during a range bin indicated as 286 during period A for a two stage canceller, the system of the invention recirculates that action bit during pulse repetition interval A and B for the two-stage canceller of FIG. 3 so that side lobe blanking occurs at that range bin during the pulse range interval D as indicated by 288. If, for example, the side lobe blanking occurs during PRI interval B, for a two-stage system, the counter has decreased to 1 for the two-stage canceller, and during interval C, the action bit is shifted through the register 144 to again provide side lobe blanking at 288 during the pulse repetition interval D. Thus, irregardless of when the side lobe blanking gate occurs, side lobe blanking is performed during the interval D when the target data is utilized by the radar system. A similar type operation is performed by MTI units having other or any number of stages as previously explained. A pulse 290 shows the pulse target signal that would occur except for the system of the invention.

To explain the stabilizing effect of fill pulses during the fill pulse intervals for a 5 pulse burst system, the energy return will be considered over three range intervals, $X_0$, $X_1$ and $X_2$ respectively representing the range interval defined by return from the present pulse, the previous pulse and the second previous pulse. The energy may be defined as:

| Pulse Interval | Received Energy |
|---|---|
| 1 | $A_0$ |
| 2 | $A_0 - B_0 + A_1$ |
| 3 | $A_0 - 2B_0 + C_0 - 2A_1 + A_2 + B_1$ |
| 4 | $B_0 - 2C_0 + D_0 + A_1 - 2B_1 + C_1 - 2A_2 + B_2$ |
| 5 | $C_0 - 2D_0 + E_0 + B_1 - 2C_1 + D_1 + A_2 - 2B_2 + C_2$ |

During the fifth pulse intervals stabilization has occurred. If in a conventional system, any of the return energy is blanked, an improper fill condition and imperfect cancellation during those range bins results in false target signals during the fifth PRI.

Thus, for step scan radar operation the system of the invention prevents side lobe blanking during the fill pulse intervals so that during the later pulse interval when the target signal is utilized, a false target signal is not developed.

Figure 8:
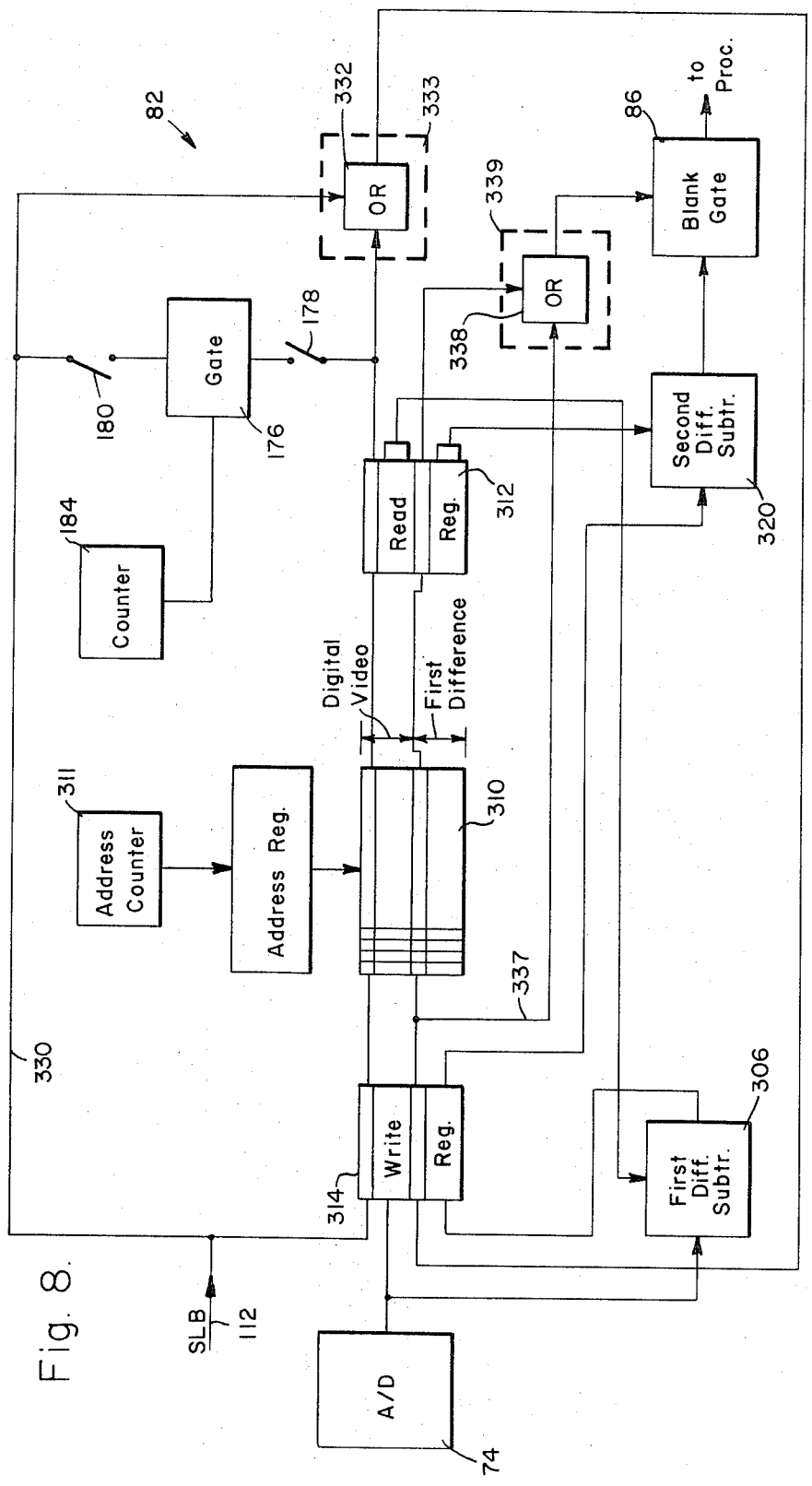
FIG. 8 is a schematic block diagram of the moving target indicator system operating with an addressable type memory to illustrate that the principles of the invention are not limited to any particular MTI configuration.

Referring now to FIG. 8, a moving target indicator system is shown of the type having an addressable memory to illustrate that the principles of the invention are not limited to any particular type of storage or memory system or moving target indicator system. A memory 310 which may be any magnetic type memory, circuit storage memory, delay type memory or of any suitable storage principle that would store the target data is illustrated as a read-write type memory from which data is read from an address and rewritten therein as the same or as new data. It is to be noted that the MTI unit of FIG. 8 may be considered the unit 82 handling the in-phase components and a separate unit may be utilized of similar nature for the MTI unit 84. The illustrated arrangement is a two-stage canceller but may have any desired number of stages. During a first PRI interval, the memory 310 is addressed in response to a repetitive counter 311 responsive to clock pulses and a read register 312 receives digital video and first difference video from the same memory address position and a write register 314 receives new digital video and the first difference residue from a first difference subtractor 316 responding to the read register 312. During the same interval a second difference subtractor 320 responds to the first difference signal from the register 312 and the first difference signal from the register 314, which are from adjacent PRI intervals, to provide a second difference signal on an output lead 324 which is applied to the blank gate 86. Operation of this type of moving target indicator system is taught in U.S. Pat. No. 3,631,488, Digital Moving Target Indicator Cancellation System, by Norol T. Evans, and need not be explained in further detail at this time. The side lobe blanking bit on the lead 112, during a first PRI interval, is applied to the memory as well as through a lead 330 to an OR gate 332 of a coupling unit 333 which also responds to the action bit in the read register 312 from the previous pulse repetition interval. The action bit passed through the OR gate 332 is applied through a lead 324 to the write register 314 and through a lead 337 to an OR gate 338 of a coupling unit 339 and in turn to the blank gate 86. As discussed relative to the shift register configurations, the coupling unit may include a delay such as a flip-flop to compensate for the delay of the subtractor units. Thus, for the illustrated two-canceller stage MTI unit, during the first PRI interval, the presently received action bit or the action bit from the previous PRI interval is passed through the OR gate 332 to the write register 314 and through the lead 337 and the OR gate 338 to energize the blanking gate 86. During a second PRI interval the action bit associated with a first difference signal at the output of the read register 312 and a delayed action bit from the previous PRI interval at the output of register 312 is received and passed through the OR gates 332 and 338 to energize the blanking gate 86. During a third PRI interval, considering blanking during only the first interval, the action bit associated with the first difference signal is passed through the OR gate 338 to the blanking gate 81. It should be noted that the action bit in the read and write register is maintained during the range bin time that the target words are therein so that blanking during substantially the entire range bin interval is provided. For step scan operation when the switches 176 and 178 are closed the gate 176 provides circulation in response to the counter 184 in the first stage as previously discussed. Thus it can be seen that principles of the invention are applicable not only to shift registers of any suitable type, such as a circuit or core type, but are applicable to addressable type memories of any suitable type which is magnetic circuit or delay types.

Thus there has been provided a side lobe canceller and moving target indicator system in which a low false target rate is provided by circulating additional bit or an action bit in memory for each range bin in each canceller stage. When side lobe blanking occurs, an associated bit is propagated through each canceller stage to control the side lobe blanking gate. During each subsequent PRI interval for that range bin, with the number of PRI intervals being equal to the number of canceller stages in the moving target unit, the side lobe blanking gate is automatically energized in accordance with the invention to eliminate false target reports. The principles of the invention are not limited to operation in the azimuth dimension but may operate in other dimensions such as elevation in an elevation scan system. The system in accordance with the invention provides highly reliable radar system utilizing a moving target indicator unit and only requiring a minimum of hardware.

What is claimed is:

1. A system for a main radar processing channel providing target signals over a plurality of pulse repetition intervals each having a plurality of range bins from a first to an Nth, comprising:

an auxiliary radar channel responsive to a multidirectional antenna, comparator means responsive to said main radar channel and to said auxiliary radar channel to provide a blanking signal, a predetermined number of canceller stages responsive to said target signal and each including target storage means for storing a plurality of target signal words with one for each range bin and for sequentially accessing the target signal for each range bin from a first to an Nth range bin, target storage means having input and outputs respectively representing the same range bin of different pulse repetition intervals, each canceller stage including subtracting means having inputs and an output with the inputs coupled to the input and the output of the target storage means of that stage, the output of said subtracting means, except for the last canceller stage, coupled to the input of the target storage means of the subsequent stage, blanking signal storage means associated with the target signal storage means for each range bin for each canceller stage, said blanking storage means each having an input and an output with said blanking storage means input for a first stage coupled to said comparator means, gating means for each canceller stage coupled to the blanking storage means input and the blanking storage means output of that stage, with the output of each gating means, except for the last canceller stage, coupled to the blanking storage means input of the subsequent stage, and a blanking gate coupled to the output of the subtracting means for the target storage means of the last canceller stage and coupled to said gating means for said last canceller stage for blanking predetermined target signals after reception of a blanking signal by said first canceller stage.

2. The combination of claim 1 in which said storage means in each stage is a shift register.

3. The combination of claim 1 in which the storage means for all stages is an addressable memory.

4. The combination of claim 1 in which the main radar processing channel includes burst timing means for providing burst timing pulses and for controlling said radar to sequentially transmit bursts of pulses comprising, recirculation gating means coupled between the output and input of the storage means of said first canceller stage, and counter means responsive to said burst timing means and coupled to said recirculating gating means for being set at the start of each burst and circulating said blanking signals a predetermined number of times so that cancelling in response to a blanking signal is performed after the last pulse of each burst.

5. The combination of claim 1 in which N plurality of stages are provided and the target signal is blanked for (N+1) pulse repetition intervals.

6. In a radar system operating over sequential pulse repetition intervals each having a plurality of range bin intervals from one to N and having a main channel and an auxiliary channel and a comparator to provide a side lobe blanking signal when the amplitude of the signal in the auxiliary channel has a predetermined relation to the amplitude of the signal in the main channel, a moving target indicator system comprising a plurality of series coupled canceller stages, each stage including target storage means for storing a plurality of target signals in sequential range bin order one to N+1 and for transferring each range bin signal from an input terminal to an output terminal of each storage means one range bin at a time, providing a residue signal at an output terminal of each canceller stage with the input terminal of the target storage means of the first stage receiving a target signal and the input terminal of each subsequent stage receiving the residue signal from the output terminal of the preceding stage, each stage having a blanking signal storage means for each corresponding range bin of said target storage means and having input and output terminals, a blanking gate coupled to the output terminal of the last stage for receiving the residue signal therefrom, an OR gate in each stage having input terminals coupled to the input and output terminals of said blanking signal storage means in the corresponding stage, and each having an output terminal with said output terminal, except in the last stage, coupled to the input terminal of the blanking storage means for the succeeding stage, and means coupling the output terminal of the OR gate in said last stage to said blanking gate to energize said gate for a predetermined number of pulse repetition intervals when a side lobe blanking signal is received by the input terminal of the blanking signal storage means of said first stage.

7. The system of claim 6 in which the radar system is a step scan system and including radar pulse burst timing means for controlling the system to transmit a burst of pulses further comprising in said first stage, recirculation gating means coupled between the output terminal and the input terminal of the blanking storage means of said first stage, and counter means coupled to said recirculation gating means and responsive to the burst timing means to provide a gate control to recirculate the side lobe blanking signal a predetermined number of times.

8. The system of claim 7 in which for P pulses per burst, said counter means is a forward counter and includes reset means to respond to each burst pulse to be set to (P-number of canceller stages) at the start of each burst of pulses.

9. The combination of claim 6 in which said target storage means and the blanking signal storage means include a plurality of shift register stages.

10. The combination of claim 9 in which each shift register stage includes a plurality of storage elements for the target signal and a one bit storage element for the blanking signal.

11. The combination of claim 6 in which said target storage means and the blanking signal storage means are an addressable memory.

* * * * *